United States Patent
Shar et al.

(10) Patent No.: US 8,948,601 B2
(45) Date of Patent: Feb. 3, 2015

(54) METHOD AND SYSTEM FOR INDOOR WIRELESS OPTICAL LINKS

(75) Inventors: Alex Shar, Rishon Letzion (IL); David Kin, Tel-Aviv (IL); Boris Glushko, Ashdod (IL); Erez Ben-Eshay, Moshav Sitriyya (IL)

(73) Assignee: RIT Technologies Ltd., Tel Aviv (IL)

( * ) Notice: Subject to any disclaimer, the term of this patent is extended or adjusted under 35 U.S.C. 154(b) by 261 days.

(21) Appl. No.: 13/545,008

(22) Filed: Jul. 10, 2012

(65) Prior Publication Data

US 2013/0101285 A1    Apr. 25, 2013

Related U.S. Application Data

(60) Provisional application No. 61/550,612, filed on Oct. 24, 2011, provisional application No. 61/568,170, filed on Dec. 8, 2011.

(51) Int. Cl.
*H04B 10/114*    (2013.01)

(52) U.S. Cl.
CPC .................. *H04B 10/1149* (2013.01)
USPC ......................... 398/129; 398/172

(58) Field of Classification Search
CPC ............. H04B 10/114; H04B 10/1141; H04B 10/1143; H04B 10/1149
USPC .......................... 398/172, 96, 129
See application file for complete search history.

(56) References Cited

U.S. PATENT DOCUMENTS

| | | | |
|---|---|---|---|
| 5,218,356 A * | 6/1993 | Knapp | 342/350 |
| 5,600,471 A | 2/1997 | Hirohashi et al. | |
| 8,204,383 B2 * | 6/2012 | Shin et al. | 398/129 |
| 2002/0033981 A1 | 3/2002 | Keller et al. | |
| 2005/0031350 A1 | 2/2005 | Haber et al. | |

(Continued)

FOREIGN PATENT DOCUMENTS

| | | |
|---|---|---|
| EP | 0355952 | 2/1990 |
| GB | 2 460 252 | 11/2009 |
| JP | 62 1100339 | 5/1987 |

(Continued)

OTHER PUBLICATIONS

Ke Wang et al. "Indoor Gigabit Optical Wireless Communication System for Personal Area Networks" 978-1-4244-5369-6/10/$26.00 © 2010 IEEE pp. 224-225 University of Melbourne, Australia Jun. 10, 2010.

(Continued)

*Primary Examiner* — Leslie Pascal
(74) *Attorney, Agent, or Firm* — Pearl Cohen Zedek Latzer Baratz LLP

(57) ABSTRACT

Embodiments of the present invention are directed to a system and method for indoor wireless optical communication. The system may include a central unit and a plurality of user units. A bi-directional optical communication link may be established over a collimated invisible light beam to enable transmission of wireless communications between a remote communication device and a user unit. The central and user units include an optical transmitter. At least one of the user unit and the central unit comprises a visible light source configured to produce a collimated visible light beam to enable alignment of the user unit and the central unit upon establishment of the bi-directional optical communication link.

14 Claims, 9 Drawing Sheets

(56) References Cited

U.S. PATENT DOCUMENTS

2008/0138077 A1* 6/2008 Stretton .......... 398/130
2009/0154934 A1* 6/2009 Jiang et al. .......... 398/135

FOREIGN PATENT DOCUMENTS

| | | | |
|---|---|---|---|
| JP | 62097438 A * | 5/1987 | .......... H04B 9/00 |
| JP | 06-224858 | 8/1994 | |
| JP | 2003-273809 | 9/2003 | |
| JP | 2003-309524 | 10/2003 | |
| JP | 2005-101853 | 4/2005 | |
| WO | WO 92/13402 | 8/1992 | |
| WO | WO 2006/046087 | 5/2006 | |

OTHER PUBLICATIONS

Ke Wang et al. "Gigabit Optical Wireless Communication System for Indoor Applications" 978-1-4244-7113-3/10/$26.00 © 2010 IEEE pp. 453-454 University of Melbourne, Australia Mar. 10, 2010.

Ke Wang et al. "High-Speed Optical Wireless Communication System for Indoor Applications" University of Melbourne, Australia IEE Photonics Technology Letters, vol. 23, No. 8. Apr. 15, 2011.

Ke Wang et al. "High-speed Duplex Optical Wireless Communication System for Indoor Personal Area Networks" University of Melbourne, Australia Optics Express 25199 vol. 18, No. 24. Nov. 22, 2010.

European Search Report for European Application No. EP 12 17 5895 dated Nov. 30, 2012.

* cited by examiner

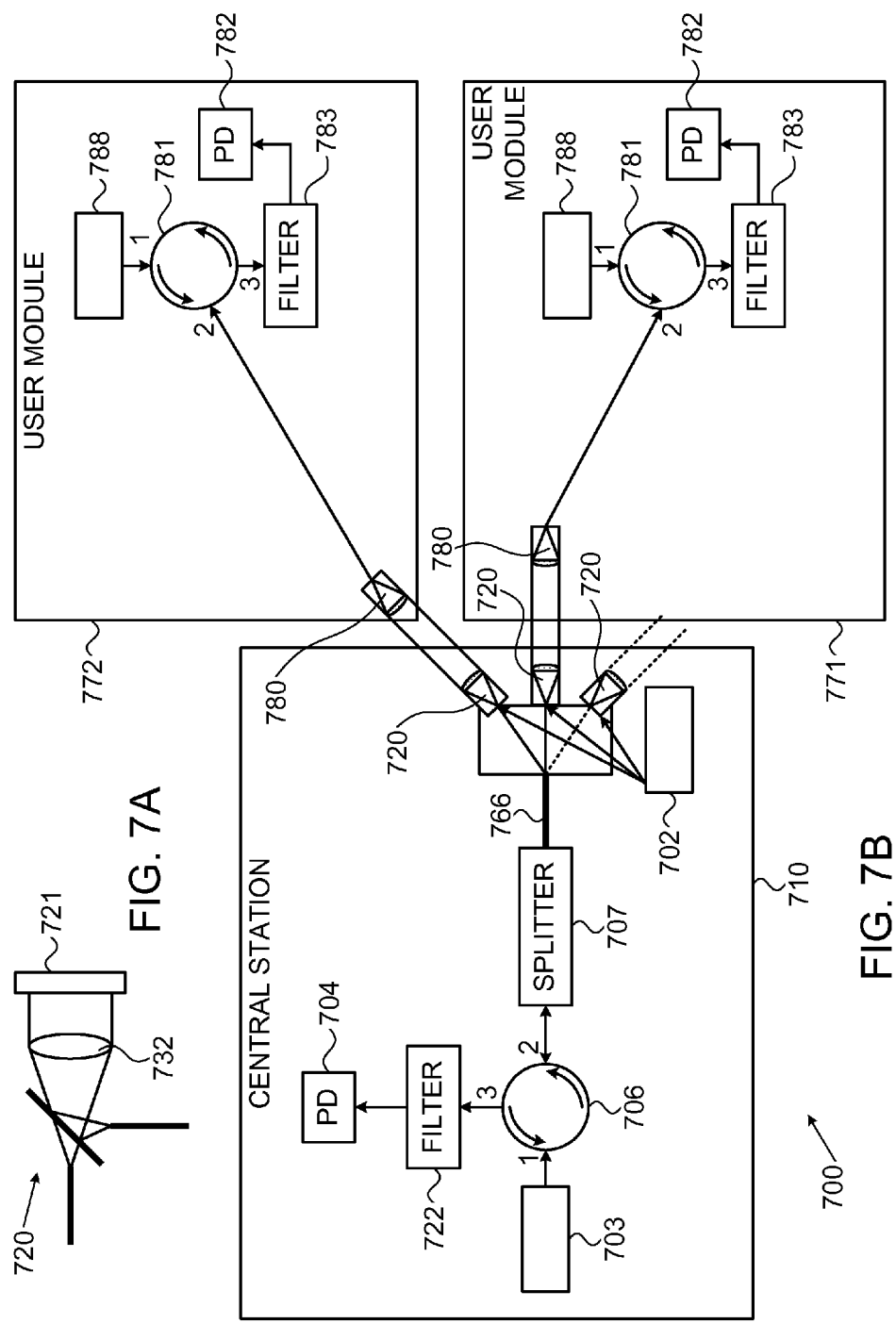

METHOD AND SYSTEM FOR INDOOR WIRELESS OPTICAL LINKS

CROSS-REFERENCE TO RELATED APPLICATIONS

This application claims priority from U.S. provisional application of No. 61/550,612, filed Oct. 24, 2011 and from U.S. provisional application of No. 61/568,170, filed Dec. 8, 2011 which are hereby incorporated by reference.

FIELD OF THE INVENTION

The present invention relates to indoor wireless optical links and networks.

BACKGROUND

Wireless communication links constitute the simplest and fastest approach for the deployment of short-range communication network in a constantly changing and flexible environment. Unlike a wired communication network, wireless communication networks enable additions, exchanges and rearrangement of users without the need to physically add or modify the positions of hardware components, such as network cables and sockets.

Early Indoor wireless optical links (IWOL) employed diffuse optical links based on a line-of-sight (LOS) principle, operating at wavelength of 950 nanometer (nm) and exhibited 125 kbit/s communication rate. Later IWOL systems presented a 1 Mbit/s link using a narrow LOS downlink operating at wavelengths around 900 nm.

A multiple source solution for optical wireless communication links require multiple light sources, such as laser diodes (LDs) or fibers for providing communication links to multiple users. Single source solutions for optical wireless communication links are unidirectional and require an inconvenient alignment between the users and the source. Additionally, these systems utilize a high radiation power which may be harmful and dangerous to those present within the room.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 7A illustrates a dual wavelength objective lens module of a central station according to embodiments of the invention;

FIG. 7B is another exemplary indoor wireless optical system according to embodiments of the invention;

Figure 1:
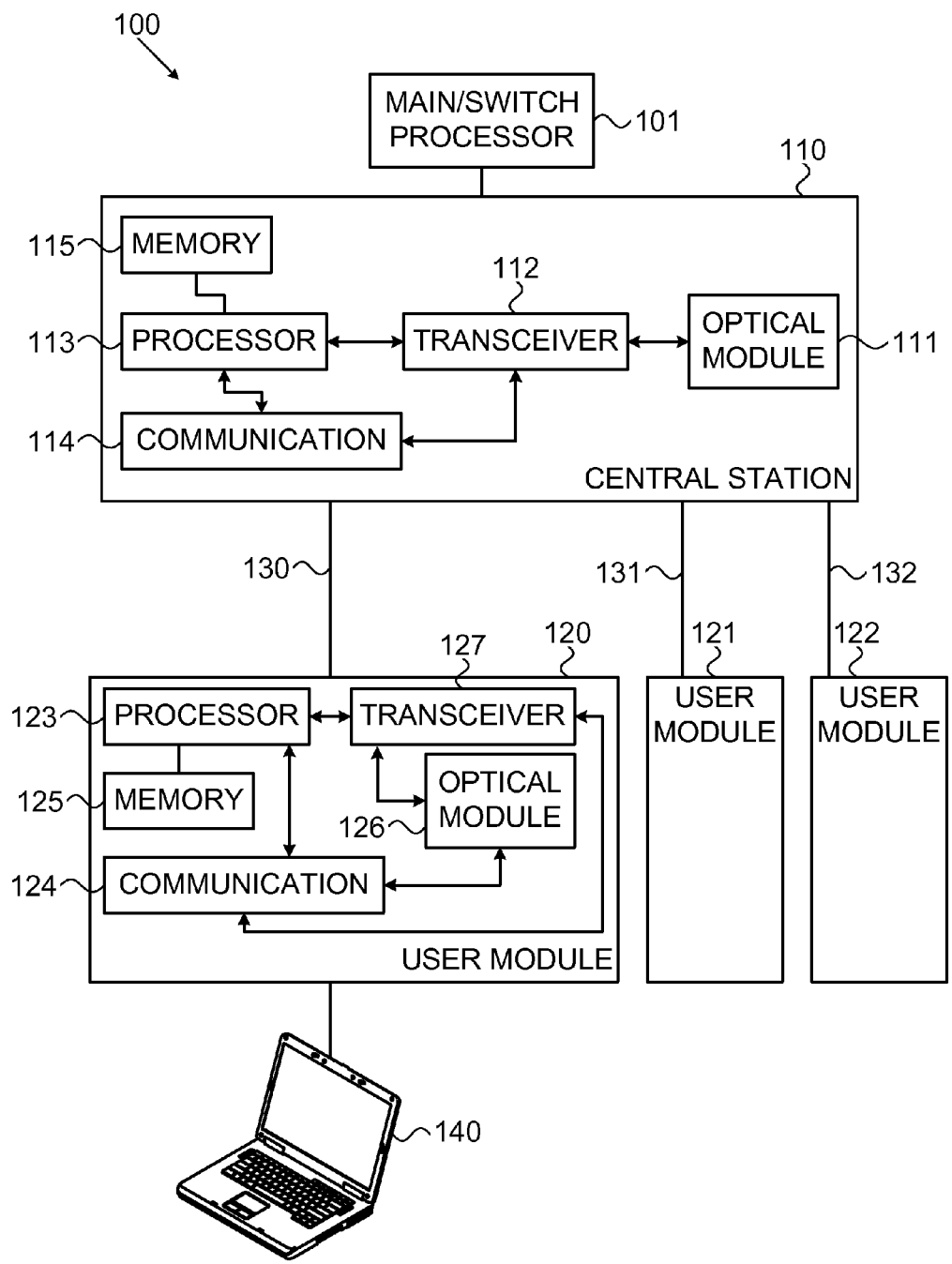
FIG. 1 is a high level block diagram of an indoor wireless optical system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification and claims to describe two or more components, devices, elements, units, parameters, or the like. For example, "a plurality of devices" may include two or more devices.

Although embodiments of the invention are not limited in this regard, the terms "transceiver" as used herein may be used throughout the specification and claims to describe any device, component or element comprising both a transmitter and a receiver. A transceiver may include a combined transmitter and a receiver which may share common circuitry or may have a common housing.

Although embodiments of the invention are not limited in this regard, the terms "photo detector", "photo sensor", "light detector" and "light sensor" as used herein may be used throughout the specification and claims to describe any device, component or element which may sense or detect light or other electromagnetic energy, for example, a photo diode, a photo transistor, a charge coupled device (CCD) and the like.

Embodiments of the invention provide a solution that utilizes a single central station for providing optical, bi-directional communication links from a central station to one or more user's modules and from the user's modules to the central station. The bi-directional radiation between the central station and the user module may a "line of sight" propagation or "non line of sight" propagation. Setting an optical connection or link between the central station and a user module may include an alignment process which may allow the user to set his user module in a position and/or a direction where the bi-directional communication link to the central station may exist. The alignment process may include detection of visible light that visualizes the propagation of invisible light of the communication link, where the visible light may originate from the central station and/or from the user module. The alignment may further include aligning the position of the user module according to the visible light to set an optical connection between the central station and the user module.

Embodiments of the invention may include a bidirectional communication link having, theoretically, an unlimited link speed as the speed of transmitting and receiving is the speed of light. The performance of the bidirectional communication link may practically be limited only by the performance of the communication devices, e.g., a modem device of 10 Gbps, 100 Gbps.

Reference is made to FIG. 1. which is a high level block diagram of an indoor wireless optical system according to embodiments of the invention. An optical wireless system 100 may include a central station 110, coupled to a main processor, e.g., a switch or network processor, and one or more user units 120, 121 and 122. An optical link 130 may be created between central station 110 and user unit 120, an optical link 131 may be created between central station 110 and user unit 121 and an optical link 132 may be created between central station 110 and user unit 122. A computer or any other suitable user device 140 may be connected to a user unit, e.g., user unit 120 in order to use optical link 130 for communication purposes. User device 140 may be, for example, a personal computer (PC), a laptop, a personal digital assistant (PDA), a smart phone, a pager or any other mobile or stationary computing device.

In some embodiments of the invention, central station 110 may be positioned, located or placed at a central or main location in a room, space or area, for example, attached or hanged from a ceiling or a wall. User units 120-122, also referred to herein as users modules 120-122, may be positioned, located or placed at any applicable location from which communication links 130-132 may be created, for example, on desks, walls. Any other position which may allow alignment of the optical axis of light originated from central station 110 and light originated from user unit 120-122, also known as "boresight" may be used in embodiments of the invention.

Central station 110, also referred to herein as central unit 110, may be configured to establish a bi-directional optical communication link over a collimated invisible light beam to enable transmission of wireless communication between a remote communication device connected to switch 101 and one or more user units 120-122. User unit may include an optical transmitter to transmit optical signals over the bi-directional optical communication link and a receiver to receive optical signals transmitted from the central unit over the bi-directional optical communication link. The central unit may comprise an optical transmitter to transmit optical signals over the bi-directional optical communication link and an optical receiver to receive optical signals transmitted from the user unit over the bi-directional optical communication link. The optical transmitters of the central unit and the user unit may comprise an invisible light source and the receivers of the central unit and the user unit may comprise a photo sensor. According to embodiments of the invention at least one of the user unit and the central unit may comprise a visible light source to produce a collimated visible light beam to enable alignment of the user unit and the central unit upon establishment of the bi-directional optical communication link as described in embodiments of the invention.

Central station 110 may include an optical module 111, a transceiver 112, a processor 113, a memory 115 and a communication unit 114. Transceiver 112 may enable transmitting and receiving of data carried over optical links 130-132 to and from user units 120-122, respectively, as described in embodiments of the invention.

Transceiver 112 may include an invisible light source and a visible light source. The invisible light source, for example, an infrared laser diode, may provide radiation to create optical communication links 130-132 while the visible light source, for example, a red laser diode, may provide a visible light radiation which may allow a simple alignment between central station 110 and each of user's modules 120-122 to create each of the communication links 130-132, respectively. Additionally, a service communication channel maybe created between user modules 120-122 and central station 110 to allow transferring of control signals, for example, by communication unit 114.

Communication unit 114 may include components such as, but not limited to, one or more central processing units (CPU) or any other suitable multi-purpose or specific processors or controllers. Communication unit 114 may create a communication channel to allow transferring of control signals between central station 110 and each of the user modules 120-122. Communication unit 114 may optionally and/or additionally control the alignment process, e.g., an automatic alignment between each of the user modules 120-122 and central station 110. The communication channel created by communication unit 114 may be a low power communication channel or network which may be used for control proposes, for example, Ethernet, WiFi, Bluetooth and the like.

Optical module 111 may include optical elements, such as lenses, splitters, collimators or any other optical element which may allow optical manipulation to create each of the communication links 130-132. Optical module 111 may include, for example, a multiple-mirror-element, fiber collimators or any other device allowing light from central station to reach each of the user module 120-122.

Processor 113 may include components such as, but not limited to, one or more central processing units (CPU) or any other suitable multi-purpose or specific processors or controllers. Processor 113 may additionally include other suitable hardware components and/or software components. Processor 113 may include or execute instructions in conjunction with one or more operating systems which may be or may include any code segment designed and/or configured to perform tasks involving coordination, scheduling, arbitration, supervising, controlling or otherwise managing operation of central station 110, for example, scheduling execution of the alignment process. Processor 113 may be associated with or coupled to a memory 115 which may store data operated on or created by embodiments of the present invention such as, for example, operations required for performing an alignment process between central station 110 and each of the user modules 120-122.

According to embodiments of the invention, a user module, such as one of user modules 120-122 may be positioned, located, placed and aligned such that a communication link, e.g., one of bi-directional communication links 130-132 may be created. User module may be positioned such that a line-of-sight is available between each of the user modules 120-122 and central station 110. For example, user module 120 may be positioned, directed and aligned to create communication link 130 to/from central station 110 according to embodiments of the invention. User module 120, for example, may include an optical module 126, a transceiver 127, a processor 123, a memory 125 and a communication module 114.

Transceiver 127 may allow transmitting and receiving of data carried over optical links 130-132 to and from user modules central station 110 as described in embodiments of the invention. Transceiver 127 may include an invisible light source, for example, an infrared laser diode which may provide the optical communication links 130-132 between each of user's modules 120-122 and central station 110. Transceiver 127 may optionally include a visible light source, for example, a red laser diode, which may provide a visible light to allow a simple alignment between each of user's modules 120-122 and central station 110.

Communication unit 124 may include components such as, but not limited to, one or more central processing units (CPU) or any other suitable multi-purpose or specific processors or controllers. Communication unit 124 may create a communication channel to allow transferring of control signals between central station 110, e.g., by communication unit 144, and each of the user modules 120-122. Communication unit 124 may optionally and/or additionally control the alignment process, e.g., an automatic alignment between each of user modules 120-122 and central station 110. Control of auto alignment process may include control of power levels transmitted and/or control of the position, location and mobility of each of user modules 120-122 and/or central station 110. The communication channel created by communication unit 124 may be a low power communication channel or network which may be used for control proposes, for example, Ethernet, WiFi, Bluetooth and the like. Additionally or optionally communication unit 124 may control the optical links 130-132 and may, for example, split an optical link from user module 120 to a plurality of end users 140.

Optical module 126 may include optical elements, such as lenses, splitters, collimators or any other optical element which may allow optical manipulation to create each of the communication links 130-132. Processor 123 may include components such as, but not limited to, one or more central processing units (CPU) or any other suitable multi-purpose or specific processors or controllers. Processor 123 may additionally include other suitable hardware components and/or software components. Processor 123 may include or execute instructions in conjunction with one or more operating systems which may be or may include any code segment designed and/or configured to perform tasks involving coordination, scheduling, arbitration, supervising, controlling or otherwise managing operation of central station 110, for example, scheduling execution alignment process. Processor 123 may be associated with or coupled to a memory 125 which may store data operated on or created by embodiments of the present invention such as, for example, operations required for performing an alignment process between each of the user modules 120-122 and central station 110.

Although the scope of the invention is not limited in this regard, a computing device described in embodiments of the invention, e.g., processors 101, 123, 113 and/or computer 140 may include an operating system which may be or may include any code segment designed and/or configured to perform tasks involving coordination, scheduling, arbitration, supervising, controlling or otherwise managing operation of the computing device. Such an operating system may be a commercial or proprietary operating system. The computing device disclosed herein may include a memory which may be or may include, for example, a RAM, a ROM, a DRAM, a SD-RAM, a DDR memory chip, a Flash memory, a volatile memory, a non-volatile memory, a cache memory, a buffer, a short term memory unit, a long term memory unit, or other suitable memory units or storage units. The memory may be or may include a plurality of, possibly different memory units. The software described herein may include executable code, e.g., an application, a program, a process, task or script and may possibly be under control of the operating system.

Although in the exemplary illustration of FIG. 1, three user modules, three communication links and one processor are shown, it should be understood to a person skilled in art that the invention is not limited in this respect and according to embodiments of the present invention, system 100 may include any suitable numbers of user modules, communication links and computers. Furthermore, it should be understood to a person skilled in art that the optical module 126, transceiver 127, processor 123, memory 125 and communication module 114 included in user module 120 may be included in each user module and are shown only once for simplicity reasons.

Figure 2:
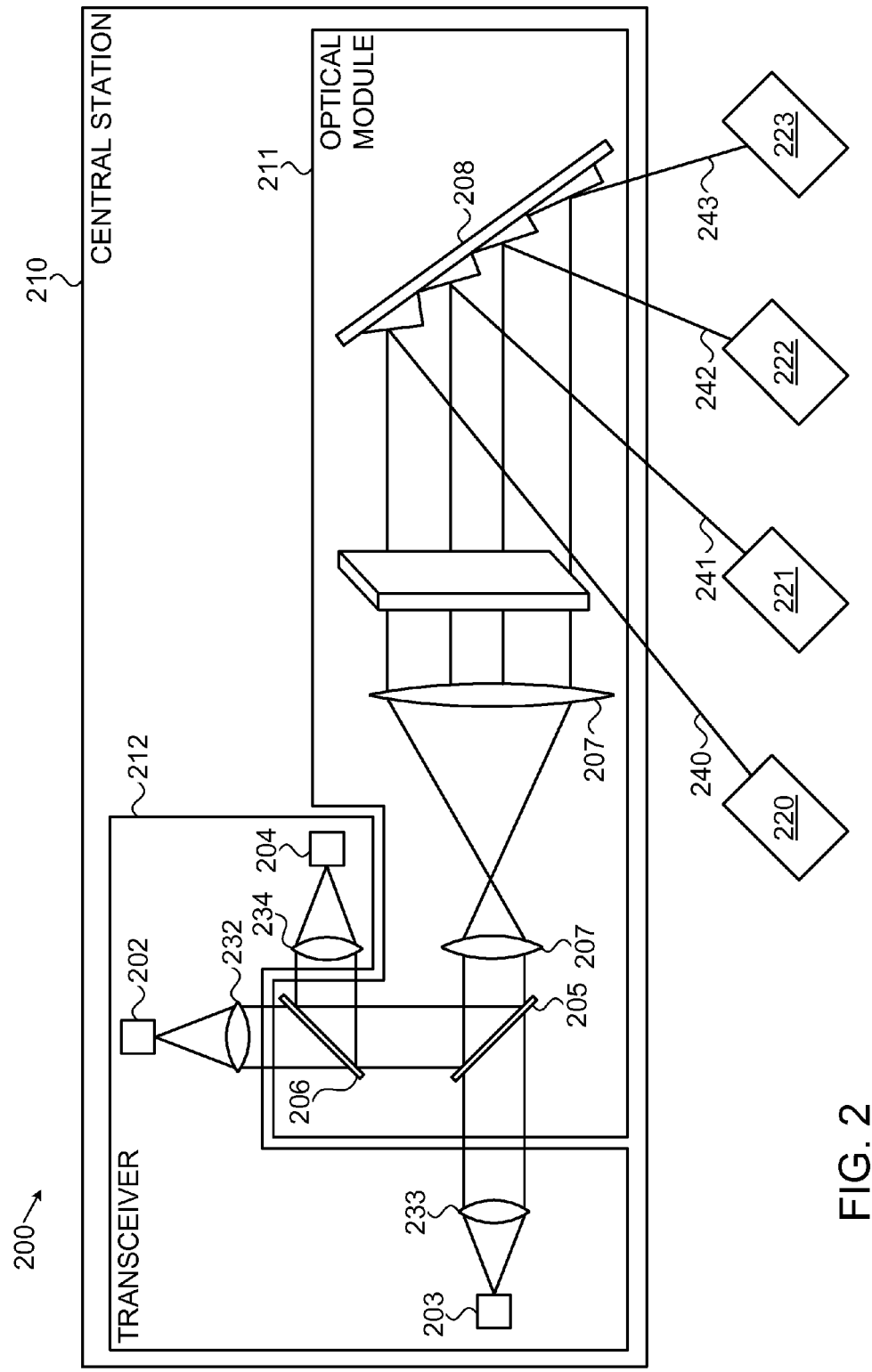
FIG. 2 is an illustration of an exemplary indoor wireless optical system according to embodiments of the invention.

FIG. 2 is a block diagram of an exemplary indoor wireless optical system according to embodiments of the invention. An exemplary optical wireless system 200 may be for example, optical system 100 of FIG. 1 and may include a central station 210 and a plurality of user modules 220, 221, 222 and 223. Central station 210 may include a transceiver 212 and an optical module 211 which may direct the light beams or light radiation from transceiver 212 towards user modules 220-223 and from user modules 220-223 towards transceiver 212 such that a bi-directional communication link may be created. Other components, element or devices, for example, elements presented in FIG. 1 may be included in system 200, although not shown for simplicity. For example, central station 210 may additionally include, although not shown a processor, a memory and a communication module.

Transceiver 212 may include an invisible light source 202 an objective lens 232, a visible light source 203, an objective lens 233, a photo detector or light sensor 204 and objective lens 234. Invisible light source 202 and objective lens 232 along with visible light source 203 and objective lens 233 may be used for transmission of light towards user modules 220-223 and are referred to herein as a "transmitter". Photo detector 204 and objective lens 234 may be used for detecting light arriving from user modules 220-223 and are referred to herein as a "receiver". Transceiver 212 may allow transmitting and receiving of data carried over optical links 240, 241, 242 and 243 to and from user modules 220, 221, 222 and 223, respectively, as described in embodiments of the invention.

Although embodiments of the invention are not limited in this regard, visible light source 203 may include any light source with an invisible radiation spectrum, for example, any infra red light source having radiation with a wavelength between 1310 and 1550 nanometers (nm), such as an infra red laser diode. Although embodiments of the invention are not limited in this regard, invisible light source 202 may include any light source with a visible radiation spectrum, for example, any red light source having radiation with a wavelength between 630 and 650 nm, such as red laser diode.

According to some exemplary embodiments of the invention, invisible light source 202 may be an infrared laser diode and may radiate, for example, at a wavelength of 1550 nm. The radiation from invisible light source 202 may be used for carrying data towards one or more user receivers 220, 221 or 222. According to some exemplary embodiments of the invention, visible light source 203 may be a red laser diode and may radiate at a wavelength of 650 nm. The radiation from visible light source 203 may be coupled to the light from invisible light source 202 in order to visualize the propagation of the invisible light, e.g., the infra red light, for setting the optical connection between transceiver 212 and each one of user modules 220-223. Photo detector 204 may be used for detecting or sensing light originated from one or more user modules 220-223.

According to embodiments of the invention, optical module 211 may include a plurality of optical elements, devices and, means to couple, join, link or set the light originated from visible light source 203 and the light originated from invisible light source 202 such that both radiations may have a substantially identical optical axis. Coupling the two light radiations may allow a human to observe the visible light, e.g., red light coming from visible light source 203, to align its direction and by that to align the direction of the invisible light, e.g., infrared light, coming from invisible light source 202 which is invisible to the human eye. During the alignment process, the position of each one of user modules 220-223 may be adjusted, altered or tuned in order to align the invisible light by observing the visible light coming from visible light source 203 as described in embodiments of the invention.

Optical module 211 may further include beam splitters 205 and 206, a beam expander 207 and a multiple-mirror-element 208. Multiple-mirror-element 208 may have a two-dimensional plate or any other device equipped with a plurality of mirrors. Splitters 205 and 206 of transceiver 212 may be used for joining and/or splitting the radiation from visible light source 203 and invisible light source 202. For example, splitter 205 may join the light from invisible light source 202 and visible light source 203, splitter 206 may split the radiation coming from a user module, e.g., user module 220 and direct the invisible light to photo detector 204. Beam expender 207 may be used for enlarging or expanding the diameter of the combined radiation coming from visible light source 203 and invisible light source 202.

Central unit 210 may include one or more optical elements to split collimated light originated from the central unit into a plurality of collimated light beams directed towards a plurality of user units 220-223.

The expanded and collimated beam transmitted from transceiver 212 may be split by multiple-mirror-element 208 into a plurality of separated beams, also referred to herein as "optical links" 241-243, each having different azimuth angle, also referred to herein as Qx and different lateral angle, also referred to herein as Qy. Multiple-mirror-element 208 may include any suitable optical element, device or component which may direct beams towards certain location. Multiple-mirror-element 208 may divert and split the combined beam output from transceiver 212 into a plurality of beams, 240-242, each directed at a different direction according to the specifications of the mirror cells, for example, the pitch between the directions of the beams may be defined by the number of mirror cells.

It should be understood to a person skilled in the art multiple-mirror-element 208 may have a variety of characteristics and may include tilted or fixed mirrors according to embodiments of the invention. Multiple-mirror-element 208 may include a plurality of mirrors or mirror cells, each mirror or mirror cell may have its own parameters and specifications such as, for example, a unique Qx, Qy angular tilts, with respect to a common mirror plate, and each may direct a portion of the beam hitting the mirror cell into a certain direction, for example, toward the location of user module 220.

Embodiments of the invention may include other options for system implementation, for example, order to make the user position flexible and movable multiple-mirror-element 208 may be implemented by a multi dimensional mirror plate, by a two-dimensional mirror plate with defined angular positions or by a linear array of multi-dimensional axis movable mirrors may be utilize in.

It should be understood to a person skilled in the art that embodiments of the invention may enable high security communication, as each user module 220-223 may be aligned to a single sub beam and therefore a dedicated communication channel or link may be created between each user module 220-223 and central station 210. Each dedicated communication link may act as a secured communication channel as it may serve only one user module. It should be clear that communication protocols based on such optical links may allow a secured communication by, for example, using dedicated data packets, secured transactions or any other secured communication designated to a single user station, e.g., user module 120.

The high security communication may be feasible due to the fact that embodiments of the invention may provide a wireless communication link which is invisible except for a substantially short alignment time in which visible light source 203 may be turned on, and in addition due to the fact that the light radiation is relatively narrow as described in embodiments of the invention.

Although in the exemplary illustration of FIG. 2, four user modules are shown, it should be understood to a person skilled in art that the invention is not limited in this respect and according to embodiments of the present invention, system 200 may include any suitable numbers of user modules.

Although in the exemplary illustration of FIG. 2, optical module 211 may include a multiple-mirror-element for directing the light towards a plurality of user modules, it should be understood to a person skilled in art that the invention is not limited in this respect and according to other embodiments of the present invention, optical module 211 may include any suitable optical elements or devices, for example, as presented in FIGS. 6-11.

It should be further understood to a person skilled in the art that FIG. 2 represents only one exemplary system which may implement or execute the invention described herein and the scope of the present invention is not limited in this respect. Other systems or implementations which may carry out the present invention may be used. For example, other optical systems using various optical modules and/or components such as circulators, splitters, pigtailed fibers, and the like may be used. Some exemplary systems which may all implement embodiments of the invention are described with reference to FIGS. 6-11.

Figure 3:
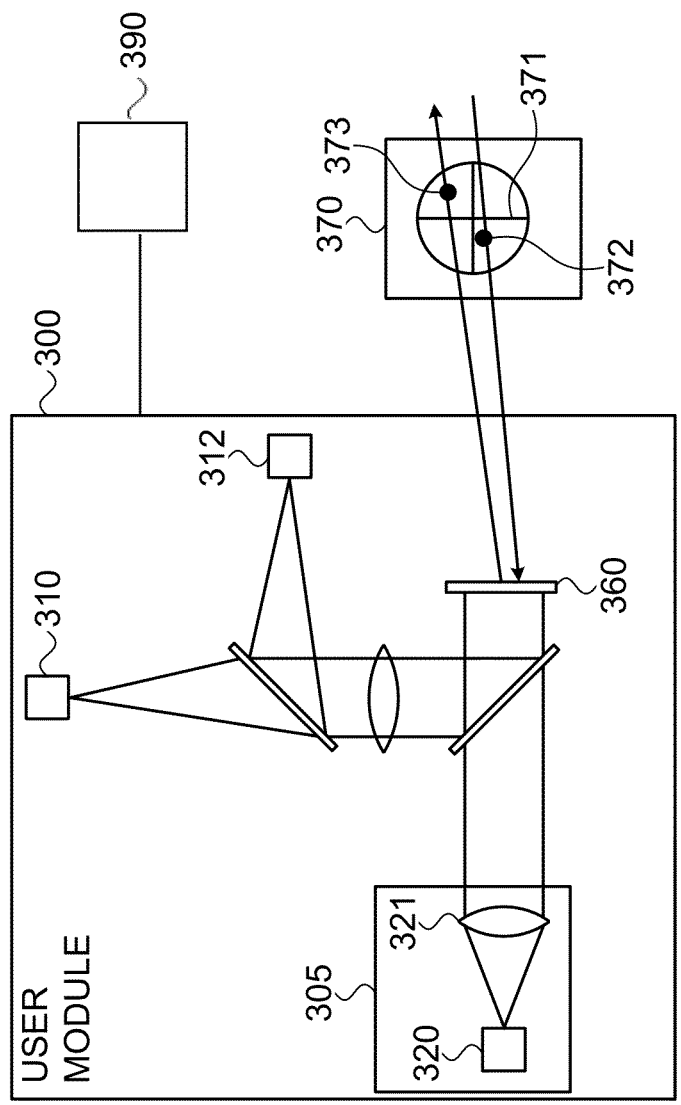
FIG. 3 is an illustration of an exemplary user module according to embodiments of the invention.

Reference is now made to FIG. 3. which is an illustration of an exemplary user module according to embodiments of the invention. Although the invention is not limited in this respect, an exemplary user module 300 may be or may perform the functionality of any one of user modules 220-223 of FIG. 2 or modules 120-122 of FIG. 1.

According to embodiments of the invention, user module 300 may detect light arriving from a central station and may direct light beams towards the central station, e.g., central station 210 of FIG. 2 or central station 110 of FIG. 1 as described according to embodiments of the invention. Although the invention is not limited in this respect, components of user module 300 may be included in one or more modules or units, for example, in a transceiver and in an optical module, e.g., transceiver 127 of FIG. 1 and optical module 126 of FIG. 1. Other components, element or devices, for example, elements presented in FIG. 1, may be included in user module 300, although not shown in FIG. 3 for simplicity reasons. For example, user module 300 may include, although not shown, a processor, a memory and a communication module.

User module 300 may include an invisible light source 310, e.g., an infrared laser diode and a photo detector 312. User module 300 may include a visible light source 320, e.g., a red laser diode and an objective lens 321, together referred to herein as "visible light source" 305.

According to embodiments of the invention, light originated from a central station may be focused exactly at photo detector 312. The opening of photo detector 312 may be covered by a flat window 360 which may be made of transparent or partially transparent material such as glass, plastic and the like. Window 360 may be positioned substantially perpendicular to the optical axis of invisible light source 310 and may either reflect back a portion of the visible light arriving from a central station or pass visible light originated from visible light source 320, towards a central station, to enable alignment of user module 300 and the central station. As the transparent window may be positioned substantially perpendicular to the optical axis of light originated from the user unit it may enable creation of apparent light spot the transparent window. In embodiments which a portion of the visible light arriving from a central station may be reflected back, window 360 may be specially designed to be transparent to invisible light and predominantly reflect visible light in order to allow both alignment procedure and communication between the central station and user module 300.

According to some embodiments alignment may be reached by using only one visible light source at the central unit and a selective reflecting mirror at the user unit. When the visible light originated from the visible light source at the central unit is turned on the light beam may hit the selective reflecting mirror, namely a mirror that is transparent to invisible light and fully reflective for visible light, and may bounced back or reflected back to the central unit window such that a coarse alignment may be achieved between the central unit and the user unit.

Reference is made back to FIG. 2, during alignment procedure the collimated beam originated from central station 210, which includes both a visible radiation and an invisible radiation, may be split, for example, by multiple-mirror-element 208 to a number of sub beams, each constitutes a part of the collimated beam originated from transceiver 212. Each of the sub beams has a different direction to cover different location in the room. Each sub beam may be transmitted from its respective directing element, for example, from a mirror cell of FIG. 2. Each directing element may be coupled, connected or attached to a window 370, also referred to herein as a "central station window" designated numeral 370 in FIG. 3. Window 370 may have an alignment mark 371, e.g., a crest image, on window 370 to direct the user in the alignment procedure.

As shown in FIG. 3, alignment mark 371 may be for example, two orthogonal lines dividing a circle into 4 equal portions. In some embodiments, window 370 may have an opening or a hole for directing the user in the alignment procedure. Other alignment marks may be used.

The sub beams from central station 210 may create a plurality of apparent light spots on elements or surfaces in the space, for example, surfaces of the working tables or desks in a room. According to embodiments of the invention, each sub beam may create a first apparent light spot 372 on the surface of central station window 370 when propagating from central station 210 via central station window 370. According to some embodiments a second apparent light spot 373 on the surface of the central station window 370 may be created by the light reflected from the user window 360. According to other embodiments the second apparent light spot 373 may be created by the light originated from visible light source 320. The position of the two light spots 372 and 373 may be adjusted or changed until they are overlapping. When light spots 372 and 373 are overlapping, namely, located at the same location on window 370, the communication link may be created. A positioning unit 390 coupled to or attached to the user unit may adjust a position of the user unit until the first light spot 372 and the second light spot 373 overlap on the transparent window 370.

During the alignment process user module, e.g., user module 220 may be positioned at a certain position where a visible light spot is created by light arriving from central station 210. Then, the user module may be moved to a specific angular direction for creating the best alignment between the user module and the central station such that the both visible spots 372 and 373 on central station window 370 may be aligned. The alignment process may be performed manually by a user or a system administrator, may be performed automatically without human intervention or may be performed semi-automatically, for example, visible light source may be turned on automatically while user module 300 may be moved manually.

Although embodiments of the invention are not limited in this respect, the visible light spot created by each sub beam on surfaces in the space and on central station window 370 may be visible spot which the human eye can observe. The visible spot may have characteristics such as a specific color according to the visible light source 203, for example, if a red laser diode is being used a red light spot may be observed, however any visible light other than red light may be used.

Figure 4:
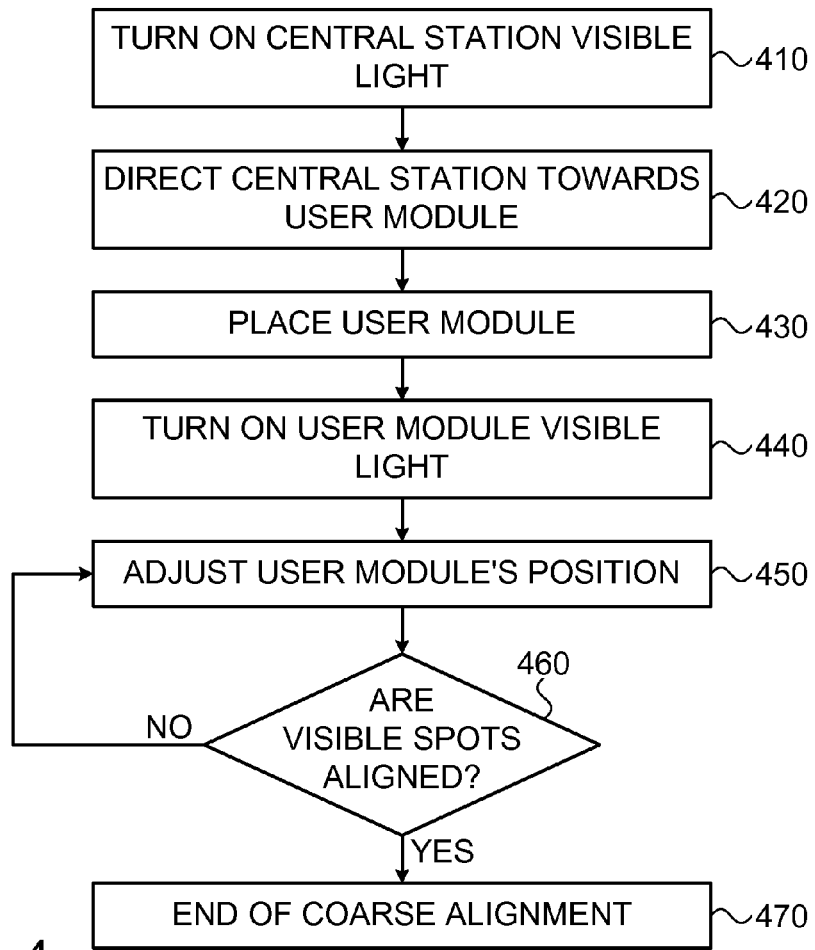
FIG. 4 is a flowchart of a method for coarse alignment of indoor wireless optical system according to embodiments of the invention.

Reference is now made to FIG. 4. which is a flowchart of a method for coarse alignment of indoor wireless optical system according to embodiments of the invention. Operations of the method may be implemented, for example, using system 100 of FIG. 1, by one or more of the elements in system 100, namely, user modules 120-122, central station 110 and/or by other suitable units, devices, and/or systems.

As indicated at box 410, the method may include turning on or operating a visible light source of a central station. This may be performed manually by a human or automatically by a machine, processor or system. According to some embodiments, the invisible light may be turned on at the same time, previously, or at any other time before/after turning on the visible light to allow data transferring. When the visible light source is turned on, a plurality of visible light spots may be observed at a plurality of locations within the space, room or area, for example, due to the use of multiple-mirror-element 208 of FIG. 2 or any other optical splitting element.

As indicated at box 420, the method may optionally include directing the central station to point towards the location of the user module or towards points, surfaces or location in which a user module may be placed in a future time. This optional operation may be performed in embodiments in which the central station may include elements such as, for example, collimators, nozzles or other elements which may be moved, tilted or change their position. It should be understood to a person skilled in the art that this operation may be performed previous to turning on or operating the visible light source of the central station, indicated at box 410.

As indicated at box 430, the method may include positioning the user module where a light spot is observed. The light spots, created by beams originating in the central station, may be located on suitable surfaces in the room such as tables, walls and the like. The user module should be placed such that the light from the central station is directed at its user window, e.g., window 360 of user module 300 of FIG. 3.

As indicated at box 440, the method may include turning on or operating the visible light source of the user module in order to use its visible radiation for aligning the user module to the central station. Operation of the visible light source of the user module may be performed manually by a human or automatically by a machine, processor or system. It should be understood that this operation is an optional operation that may be used in embodiments in which alignment procedure includes use of visible light originated from user module. In embodiments in which alignment procedure includes use of reflection of light originated from the central station this operation may not be used.

As indicated at box 450, the method may include adjusting, altering, modifying, tuning or moving the position of the user module such that the visible light originating from the central station and the visible light originating from the user module, or reflected from the user module, overlap, convene, meet or align. According to embodiments of the invention, the user module may be adjusted, rotated, twisted such that the light spot created by the light originating from the central station on the alignment window of the central station, e.g., window 370 of FIG. 3, and light spot created by the light originating from the user module on the alignment window of the central station overlaps.

As indicated at box 460, the method may include checking whether the visible light spots are aligned. A first visible light spot is created by light originating from the user module or reflected from the user module and the second light spot is created by light originating from the central station. If the two visible light spots on the alignment window of the central station are aligned, namely only one visible spot may be observed, the method may end the coarse alignment as indicated at box 470, while if the two visible light spots on the alignment window of the central station are not aligned, namely, there are two visible light spots on the alignment window of the central station, the method may return to box 450 and the position of the user module may again be adjusted or altered.

According to some embodiments of the invention, an operation of turning off the visible light sources of both the user module and the central station may be performed after a coarse alignment is reached. Turning off the visible light sources or the entire link may also be performed in other situations such as, for example, when an edge device decides to disconnect from user module, when an unauthorized device tries to connect to the user module and the like. In some embodiments all light sources may be turned off and the link may be down at the moment an edge device is disconnected from the user module in order to save power. The operation of turning off visible light sources may allow power saving as well as improvement of the security level of the communication link which may become purely invisible as soon as the visible light sources are turned off. The invisible light sources may be turned on starting at the alignment time to enable a communication link. The quality of the communication link may be sensed or detected constantly by photo detectors in the central station and in the user module, e.g., photo detectors 204 and 312. According to some embodiments when a downgrade in the quality of the communication link may be sensed, e.g., a certain drop of the power level or reaching a certain predefined threshold, the visible light sources may be turned on in order to re-align the user module and the central station by performing the alignment process again.

It should be understood to a person skilled in the art that other operations or sets of operations may be used in accordance with embodiments of the invention.

According to some embodiments of the invention, the alignment process may be performed without using visible light originated from the user module. In such embodiments, the majority of the light arriving from the central station is transmitted via the user window, e.g., window 360 to the photo detector of the user module, e.g., photo detector 312 of FIG. 3, and a relatively small portion of the visible light may be reflected back from that window toward the window of the central station, e.g., central station window 370 of FIG. 3. As the user window may be specially designed to be transparent to invisible light and predominantly reflect visible light. The reflected light may generate a visible light spot on the surface of the alignment window of the central station. The position of the user module may be altered or changed to a specific angular direction until the two visible light spots appears on the central station window. Then, the user module may be adjusted until the two spots overlap. A rough or coarse alignment is reached when one combined spot appears within the central station window.

In such embodiments, two light spots may be observed on the window of the central station, e.g., central station window 370, one spot illuminating the central station window on the way from central station towards user module, e.g., spot 372 of FIG. 3, and the second reflected from user window or created by light arriving from a visible light source in the user module, e.g, spot 373 of FIG. 3. When the light spot reflected from user window or originated from user module, appears within a circle, crest or other mark on the central station window and overlaps the first spot (originated from the central station) on central station window, it may be considered that a rough or coarse alignment is achieved.

According to embodiments of the invention, a fine alignment may be reached by bringing both light spots to the center of central station window 370. By performing fine alignment and bringing both light spots to the center of central station window 370, central station and user unit may be considered as aligned.

Figure 5:
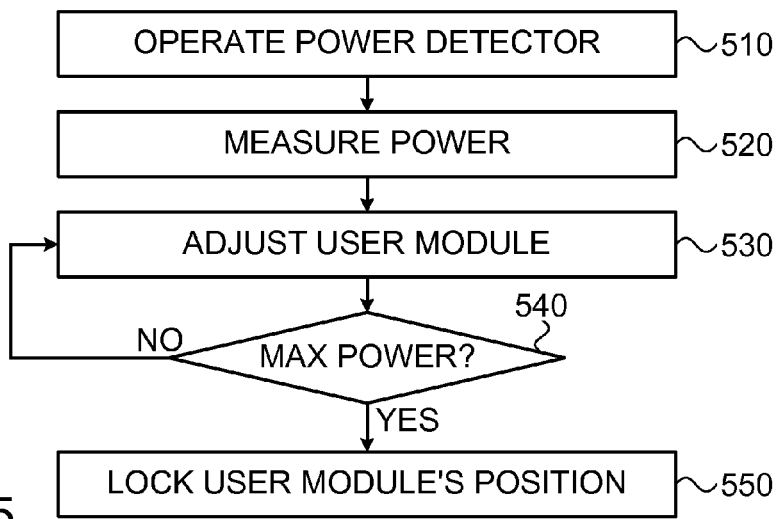
FIG. 5 is a flowchart of a method for fine alignment of indoor wireless optical system according to embodiments of the invention.

Reference is now made to FIG. 5. which is a flowchart of a method for fine alignment of indoor wireless optical system according to embodiments of the invention. Operations of the method may be implemented, for example, using system 100 of FIG. 1, by one or more of the elements in system 100, namely, user modules 120-122, central station 110 and/or by other suitable units, devices, and/or systems.

As indicated at box 510, the method may include operating a power detector or power sensor, such as a power meter, coupled to or connected to the user module. The power meter may be an optical power meter which may be connected to the photo detector of the user module, e.g, photo detector 312 of FIG. 3. Other power detectors may be used, for example, a digital power detectors operated by a computer connected to the user module or any other power detector.

As indicated at box 520, the method may include measuring the power of the radiation detected or sensed by the photo detector of the user module, e.g., by photo detector 312 of FIG. 3. Photo detector 312 may measure the power of the light originated from the invisible light source of the central unit. According to embodiments of the invention, the method may include monitoring the invisible and/or visible radiation originating from the central station and measuring the detected power of the radiation arriving to the photo detector of the user module. Other embodiments, additionally or alternatively, may include measuring the power of the radiation detected or sensed by the photo detector of the central station, e.g., by photo detector 204 of FIG. 2.

As indicated at box 530, the method may include adjusting, moving, altering or changing the position of the user module by fore example, a positioning unit coupled to the user unit, such as to maximize the power of the radiation arriving to the photo detector of the user module which may be measured by the power detector. The user module may be tilted, moved, adjusted, tuned or otherwise changed its position, manually or automatically such that the power of the light beam arrived to the user module may be maximal.

According embodiments of the invention, user module may include angular alignment means, such as screws, allowing user module to be adjusted in angular directions, e.g., in Qx, Qy and Qz angles. User module, additionally or alternatively, may be moved along horizontal and vertical directions in order to find the preferred position, namely, the position in which a maximal power is detected. According to embodiments of the invention, user module may include a positioning unit which may adjust a spatial position of the user unit relative to the central unit, e.g., until a maximal power is measured. The positioning unit may be coupled to, attached to or embedded within user unit.

As indicated at box 540, the method may include checking if a maximum power is reached and detected in order to achieve optimal alignment. If a peek of the power is reached and measured the method may include locking and/or fastening the user module to its current position in order to keep the optimal alignment reached as indicated at box 550. If a peek of the power has not reached the method may include further adjustment of the user module position as indicated by returning to box 530. Further adjustment of the position of the user module followed by a power measurement may be performed periodically until a maximum power may be detected as indicated at box 540.

It should be understood to a person skilled in the art that other operations or sets of operations may be used in accordance with embodiments of the invention.

According to some embodiments of the invention, an optimal alignment may be controlled and achieved by detecting maximal invisible light signal on one of the central station and user module or by both of the central station and user module, e.g., by detecting and measuring the invisible light signal power on both the user module and the central station.

In some embodiments of the invention, user module, e.g., user module 120 of FIG. 1 and central station, e.g., central station 110 of FIG. 1, may include an optical feedback control for simplifying and automating the fine alignment procedure. The feedback control may be implemented by a processor, e.g., communication unit 114, processor 113 or processor 123 of FIG. 1 which may receive input data related to the measured power of the invisible radiation signal received by the user photo detector as measured by a power meter coupled to the photo detector. The fine tuning may be updated during the transmission based on the power of the invisible light signal detected at the user module photo detector. The photo detector of the user module may be connected or combined with a power meter which may detect and measure the power of the received invisible light.

Figure 11:
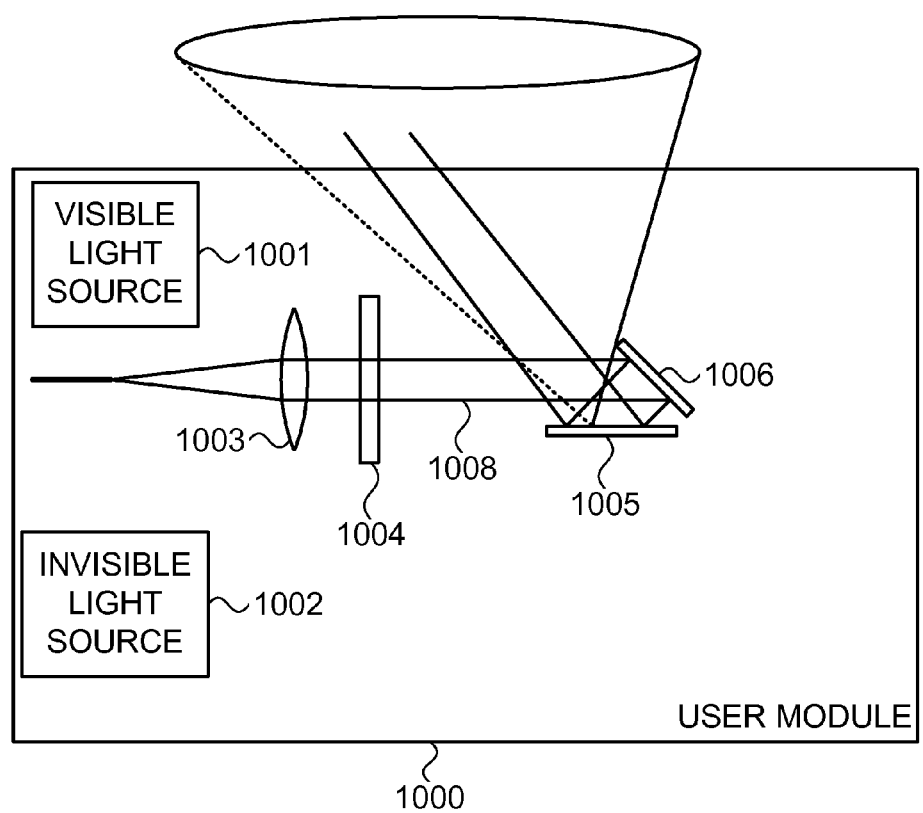
FIG. 11 demonstrates a user module according to embodiments of the invention.

The fine tuning of the alignment may be performed either by mechanical means, for example, by adjusting the user module location either manually, e.g., by a holder having two screws that vary the angular position of the user module in the Qx, Qy and Qz directions or automatically, for example, by one or more mirrors as described with respect to FIG. 11.

The automated adjustment of the three dimensional position or horizontal, vertical and/or angular position of the user module along with the optical signal feedback loop may enable on-line monitoring of the user position during the communication session, and instant on-line corrections and updates of the alignment. Such embodiments may expand the flexibility of the user to move around the room or in the space during the communication session. The system will track the user position and update the alignment to ensure the smooth communication without breaking the connection to the central station.

In some embodiments, the ability to track the link quality by measuring the power may be used to adjust the level of the radiation of the light sources. For example, if the link quality is maximal but the communication session does not require such a high power link, e.g., the data transfer rate is lower than the maximal rate, the power of the radiation from user module and central station light sources may be lowered in order to save power.

FIGS. 6-11 are exemplary systems which may implement or execute the invention described herein by different optical systems, elements, modules, components and the like. It should be further understood to a person skilled in the art that FIGS. 6-11 represents only exemplary systems which may implement or execute the invention described herein and the scope of the present invention is not limited in this respect.

Figure 6:
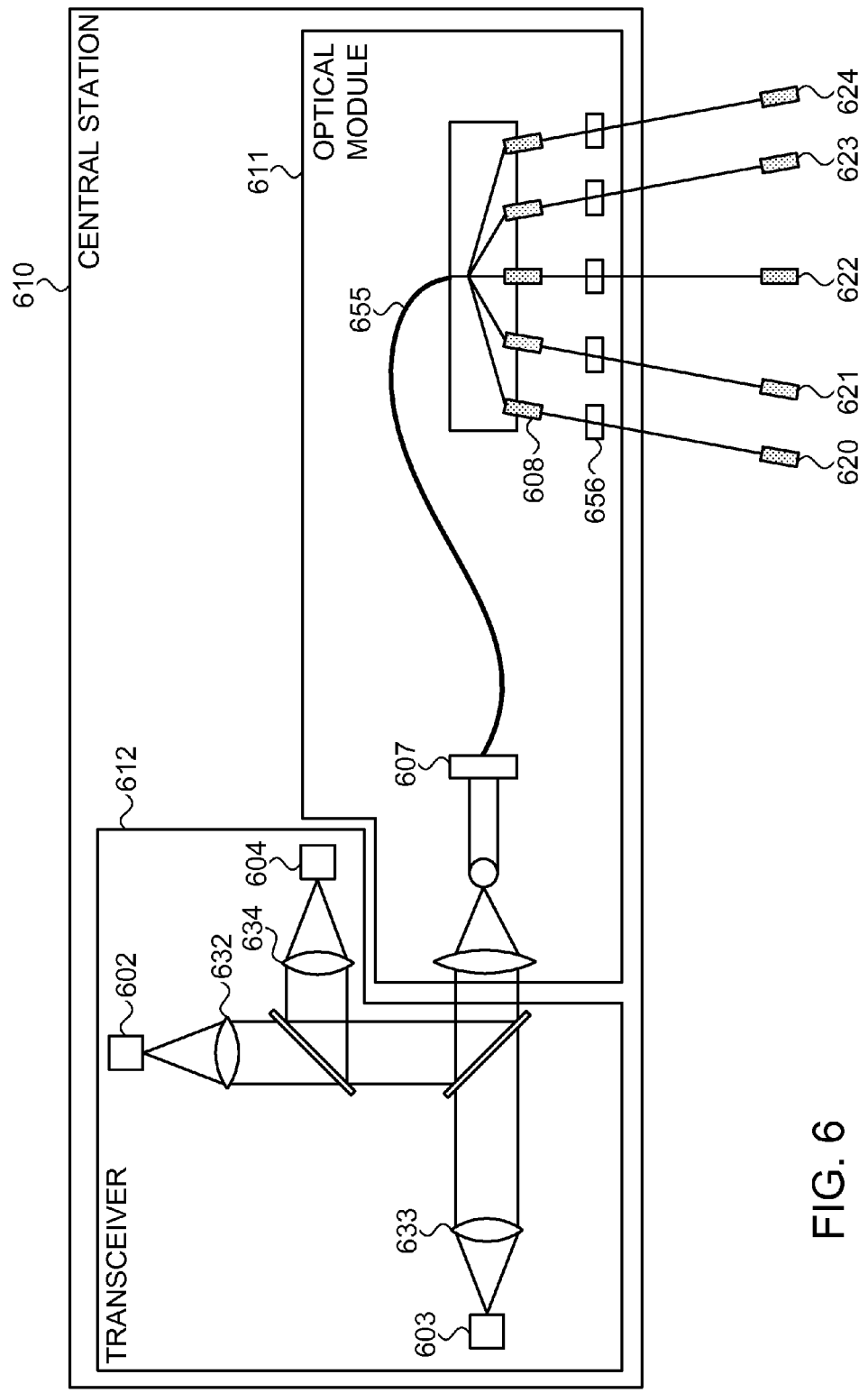
FIG. 6 is another exemplary indoor wireless optical system according to embodiments of the invention.

Reference is now made to FIG. 6 which is another exemplary indoor wireless optical system according to embodiments of the invention. Optical wireless system 600 may be for example, optical system 100 of FIG. 1 and may include a central station 610 and a plurality of user modules 620, 621, 622, 623 and 624. Central station 610 may include a transceiver 612 and an optical module 611 which may direct the light beams or light radiation from transceiver 612 towards user modules 620-624 and from user modules 620-624 towards transceiver 612. Other components, element or devices, for example, elements presented in FIG. 1 may be included in system 600, although not shown for simplicity reasons. For example, central station 610 may include, although not shown a processor, a memory and a communication module.

Transceiver 612 may be similar to transceiver 212 presented in FIG. 2 and may include a visible light source 602, an objective lens 632, an invisible light source 603, an objective lens 633, a photo detector or light sensor 604 and objective lens 634. Visible light source 602 and objective lens 632 along with invisible light source 603 and objective lens 633 may be used for transmission of light towards user modules 620-624 and are referred to herein as "transmitter". Light sensor 604 and objective lens 634 may be used for detecting light received from user modules 620-624 and are referred to herein as "receiver".

Optical module 611 may include an optical conductor 607, such as, for example, a fiber splitter, which may be used in order to split the light radiation coming from visible light source 602 and from invisible light source 603. Optical conductor 607 may be connected via a bundle, group or bunch of fibers 655 to a plurality of collimators 608, for example, fiber collimators. Each of collimators 608 may include or may be attached to an objective which may include a window 656.

Window 656 is similar to central station window 370 of FIG. 3. Each of collimators 608 may include variable Qx, Qy and Qz angular positions enabling coverage of a wide area within the room, space or area. An alignment process similar to the alignment procedure described with respect to FIGS. 4 and 5 may be performed between each of collimators 608 and one of user modules 620-624.

According to some embodiments of the invention, other system topologies may be applicable, for example, central station 610 may be located in an outer central location such as a corridor which located outside one or more rooms or spaces. Each of collimator 608 may be located in any room or space, by using a fiber, cable or wire long enough to locate the collimator at the required position. Any other optical means, elements or devices may be used.

According to some embodiments of the invention, each user module may be used as a local switch, namely, a single communication link between a collimator and a user module may be used be other users, if the user module include a switch which may allow other computer of other users to connect to it. By using such a switch, each of user modules 620-624 may serve a plurality of users.

Reference is now made to FIG. 7 which describes another exemplary indoor wireless optical system according to embodiments of the invention. An optical system 700 may include a central station 710 and a plurality of user modules, e.g., user module 771 and user module 772. Central station 710 may include an invisible light source 703 as the transmitter, a photo detector 704 as the receiver and a visible light source 702. Each of user modules 771 and 772 may include an invisible light source 788 as the transmitter and a photo detector 782 as the receiver. According to some embodiments, each of user modules 771 and 772 may further include a visible light source (not shown).

Invisible light source 703 of central station 710 may emit light at a first wavelength, for example at a wavelength of 1550 nm and invisible light source 788 of user module 772, may emit light at a second wavelength, different than the wavelength emitted from central station 710, for example at a wavelength of 1490 nm. Accordingly, photo detector 704 may be configured to detect light transmitted from the user modules, for example at a wavelength of 1490 nm and photo detector 782 may be configured to detect light transmitted from central station 710, for example at a wavelength of 1550.

Central station 710 may further include an optical circulator 706, e.g., a fiber circulator, having a plurality of ports. Circulator 706 may be connected to invisible light source 703 via port 1 of circulator 706 and to photo detector 704 via a filter 722 and port 3 of the circulator. If light enters via port 1 of circulator 706, it exits via port 2 of circulator 706 while if light enters via port 2 of circulator 706, it exits via port 3 of circulator 706. Filter 722 may prevent parasitic return losses of certain wavelengths from entering photo detector 704. Such a filter may split the signal coming from the user module and allow only signals at a desired wavelength, to reach photo detector 704. For example, splitting light originating from user module 772, into two wavelengths, a first of 1490 nm and a second of 1550 nm and allow only pure signals at a desired wavelength, for example, at 1490 nm to reach photo detector 704.

Each of user module 772, 771 may include an optical circulator 781, e.g., a fiber circulator, connected to invisible light source 788 via port 1 of circulator 781 and to photo detector 782 via filter 783 and port 3 of circulator 781. If light enters to optical circulator 781 via port 1, it exits via port 2 and if light enters to optical circulator 781 port via port 2, it exits via port 3. Filter 781 may prevent parasitic return losses of certain wavelengths from entering photo detector 782. Such a filter may split the signal coming from central station 710 and allow only signals at a desired wavelength, to reach photo detector 782. For example, splitting light originating from central station 710, into two wavelengths, a first of 1490 nm and a second of 1550 nm and allow only pure signals at a desired wavelength, for example, 1490 nm to reach photo detector 782.

For data transfer from central station 710 to a user module, e.g., user module 771, light from invisible source 703 may enter optical circulator 706 via port 1, and may be transmitted via port 2 towards splitter 707. Splitter 707 may be, for example, a fiber splitter which may be connected to a bundle of wires, e.g., fibers 766. Each output of splitter 707 may be coupled to a corresponding objective lens module 720, which may couple invisible light emitted from invisible light source 703 with visible light emitted from visible light source 702. To establish a communication link between a user module (771 or 772) and central station 710, each of the user modules may be aligned with a corresponding objective lens module 720. The visible light reflected from the user module or originated from a visible light source in the user module may enable a simple and quick alignment process. When user module 771 and central station 710 are aligned after the alignment process presented in embodiments of the invention, the invisible portion of the light beam (for example, at 1550 nm) may be transferred via port 3 of user circulator 781 through the user filter 783 to user photo detector 782.

Each objective lens module 720 may include a collimator for one or more wavelength, e.g. a dual-wavelength collimator, which may collimate the light from invisible light source 703 and the visible light from visible light source 702. According to some embodiments to the invention, each user module may include an objective lens module 780 with an invisible wavelength collimator. In this case, there is no need for a dual-wavelength collimator. User objective lens module 780 may include a transparent window for reflecting a portion of the visible light back toward the corresponding objective lens module 720 to enable alignment of user module 771 and central station 710.

Reference is further made to FIG. 7A which illustrates a dual wavelength objective lens module of a central station according to embodiments of the invention. A dual wavelength objective lens module 720, is a detailed illustration of each one of objective lens module 720 of FIG. 7. Objective lens module 720 may be used for collimating both invisible light and visible light, for example, infrared light and red light. Objective lens module 720 may include a window 721, a collimating lens 732 and optical means to couple the light from invisible light source, e.g., invisible light source 703 of FIG. 7, and visible light from visible light source, e.g., visible light source 702 of FIG. 7. Objective lens module 720 may have mechanical angular alignment means to adjust the Qx, Qy and Qz angles and direct the output collimated beam toward one of the user module, e.g., user module 772 and 771 of FIG. 7. Window 721 may be similar to window 370 of FIG. 3 and may have an alignment mark on window 721 to assist in the alignment procedure. The alignment mark on window 721 may be any mark, sign or indication for example, two orthogonal lines dividing a circle into 4 equal portions or any other mark or indication.

Reference is made back to FIG. 7, embodiments of the invention may allow transferring data from user module 772 (or 771) to central station 710 by utilizing light at a different wavelength than light utilized for transferring data from central station 710 to one or more user modules 772 and 771, for example, wavelength of 1490 nm may be used for transferring data from user module 772 (or 771) to central station 710 while wavelength of 1550 nm may be used for transferring data from central station 710 to user module 772 (or 771).

The light transmitted from invisible light source 788 of user module 772 may enter port 1 of circulator 781 and exit circulator 781 from port 2, towards user objective module 780. The light may enter a corresponding fiber inside bundle 766 by objective lens module 720 of central station 710 and may enters port 2 of circulator 706. The light is transferred via port 3 to photo detector 704. Using such a setup allows bi-directional connection between central station 710 and each of the user modules 771, 772. Moreover, the best alignment conditions between the central station 710 and user modules may result automatically by adjusting an optimal alignment between one of the user modules, e.g., user module 771 and the central station 710 which may simultaneously applied for all other user modules, e.g., for user module 772.

Other embodiments of the invention may include other options to utilize central station 710 and user module structure, for example, based on a gigabit Ethernet passive optical network (GEPON) bi-directional transceiver. Any other utilization options may be used.

Figure 8A:
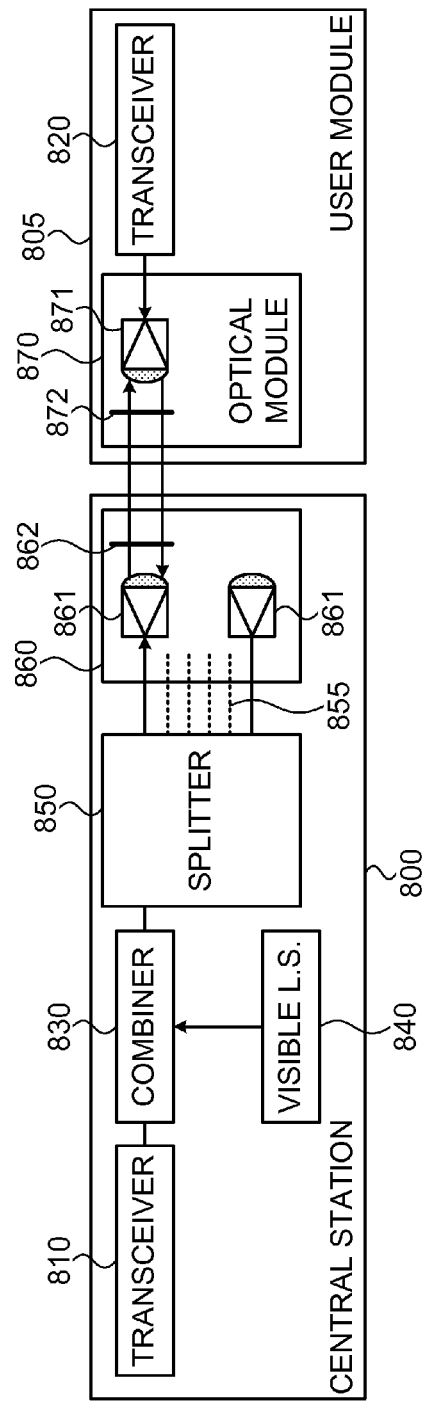
FIGS. 8A and 8B illustrate a bi-directional IWOL system according to embodiments of the invention.
Figure 8B:
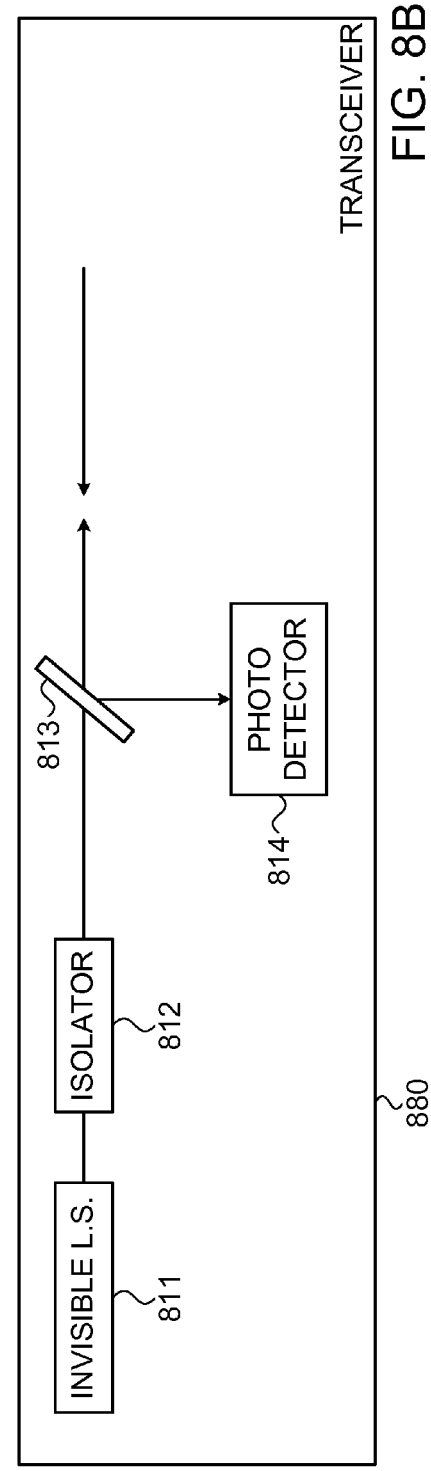

Reference is now made to FIGS. 8A and 8B which illustrate a bi-directional IWOL system according to embodiments of the invention. FIG. 8A illustrates a bi-directional IWOL system according to embodiments of the invention and FIG. 8B illustrates a transceiver of a bi-directional IWOL system according to embodiments of the invention. A transceiver integrates the functionality of a photo detector acting as a receiver and an invisible light source acting as a transmitter in a single module. FIG. 8A shows a central station 800 and an exemplary one of a plurality of user modules 805. Each of user modules 805 may include a user transceiver 820 and a user optical module 870. Optical module 870, may be similar to window 360 of FIG. 3 and may include a transparent window 872 that may either reflect visible light arriving from central station 800 in some embodiments or transfer visible light arriving from visible light source inside user module 805 in some other embodiments. Optical module 870 may include a plurality of objective lens modules 871, each of objective lens modules 871 may include or may be coupled to a window 872 to enable the alignment process as presented in embodiments of the invention.

Central station 800 may include a transceiver 810, a visible light source 840 which may emit at a visible wavelength, for example at 650 nm, a beam combiner 830 that combines the visible light beam emitted from visible light source 840 and invisible light beam emitted from transceiver 810, a beam splitter 850 to split the combined beam arriving from combiner 830 and an optical module 860 coupled to splitter 850 via a bundle of optical wires 855 such as optical fibers. Optical module 860 may include a plurality of objective lens modules 861, each coupled to a respective fiber to collimate the sub beams. The number of modules 861 may be equal to the number of output channels of splitter 850. Each of objective lens modules 861 may include or may be coupled to a window 862 to enable the alignment process as presented in embodiments of the invention.

FIG. 8B illustrates a transceiver of a bi-directional IWOL system according to embodiments of the invention. Transceiver 880 may be either transceiver 810 of central station 800 of FIG. 8A or transceiver 820 of user module 805 of FIG. 8A. Transceiver 880 may include an invisible light source module 811, emitting invisible light radiation and a photo detector or photo sensor 814 such as a photodiode configured to detect light at a certain wavelength. Photo detector 814 may include or may be coupled to a trans-impedance amplifier module.

Transceiver 880 may further include an isolator 812 to block reflected light from invisible light source 811 and an optical filter 813, such as for example, a Wavelength-Division Multiplexing (WDM) filter configured to transmit the beam originated from transceiver 880 and reflect beam arriving to transceiver 880 and direct it to photo sensor 814.

An exemplary transceiver 880 may be a central station transceiver 810. In such an exemplary transceiver invisible light source module 811 may emit light at, for example, wavelength of 1310 nm and photo detector 814 may be configured to detect light at a different wavelength, for example at 1490 nm. Optical filter 813 may be configured to transmit light at wavelength 1310 nm originated from invisible light source module 811 and reflect the light beam originated from a user module, e.g., user module 805 at a wavelength of, for example, 1490 nm, and direct it to photo detector 814.

Another exemplary transceiver 880 may be a user module transceiver 820. In such an exemplary transceiver invisible light source module 811 may emit light at, for example, wavelength of 1490 nm and photo detector 814 may be configured to detect light at a different wavelength, for example at 1310 nm. Optical filter 813 may be configured to transmit light at wavelength 1490 nm originated from invisible light source module 811 and reflect the light beam originated from a central station, e.g., central station 800 at a wavelength of, for example, 1310 nm, and direct it to photo detector 814.

According to some embodiments, if light at a first wavelength used for transmitting and light at a second wavelength used for receiving and both are propagating through the same optical elements, the anti-reflecting (AR) coating for these optical elements may be chosen to be at wide bandwidths covering both wavelengths.

As shown in FIG. 8A, the beam originated from the invisible light source of transceiver 810 may be mixed with a visible light beam, e.g., red light beam radiated at, for example, 650 nm from visible light source 840. The visible light may be used for alignment purposes and may be coupled to the invisible light by combiner 830. The joint dual wavelength radiation may be coupled to splitter 850. Optical module 860 may consist of a plurality of objectives 861. Each optical module 861 may have mechanical angular alignment means that enable to direct it to the desired user transceiver module.

Figure 9:
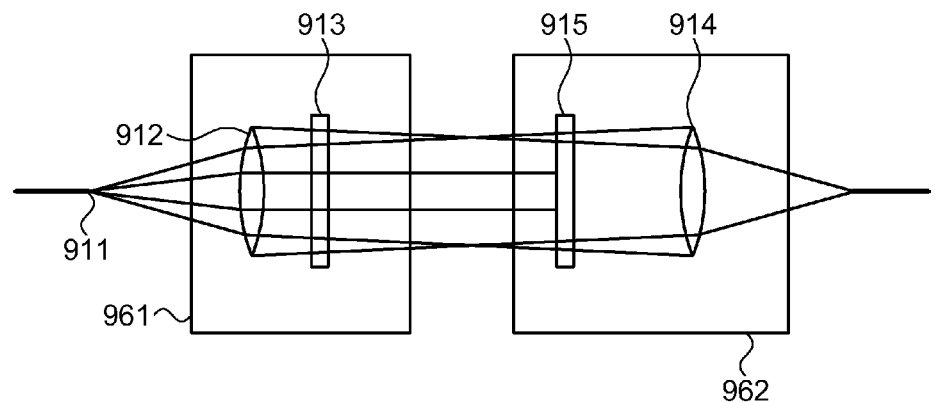
FIG. 9 demonstrates elements of a central station and a user module during alignment process according to embodiments of the invention.

Reference is made to FIG. 9 which demonstrates elements of a central station and a user module during alignment process according to embodiments of the invention. According to embodiments of the invention, a central station objective lens module 961, may be, for example, objective lens module 861 of FIG. 8A and may include a collimating lens 912 and a window 913. A user station objective lens module 962, may be, for example, objective lens module 871 of FIG. 8A and may include a collimating lens 914 and a window 915. Objective lens module 961 may be specially configured for manipulating two or more wavelengths of light, for example, a dual-band collimator or a multi-band collimator. For example objective lens module 961 may manipulate three wavelengths: 1310 nm, 1490 nm and 650 nm. Objective lens module 961 may receive a sub-beam, from a splitter, e.g., splitter 850 of FIG. 8A, via corresponding optical means, for example, via a wire or fiber. Objective lens module 961 may diverge the invisible light and collimate both visible light and invisible light for alignment purposes. One advantage of objective lens module 961 is that it may enable to accommodate a plurality of wavelengths together by using a single wavelength structure, for example, wavelength of 1310 nm, 650 nm, and 1490 nm, through the same objective, It should be understood to a person skilled in the art that objective module 961 and/or collimating lens 914 and/or collimating lens 912 may be a multi-band collimator or any other multi-band collimating element to collimate light having two or more wavelengths.

The design of the elements, e.g., distance between a wire end 911 and lens 912 may be determined such that the visible output beam may be collimated while both invisible beams, e.g., light at 1310 nm and 1490 nm, may be diverged. The collimated visible light beam may be used for alignment of the transceiver of the central station, e.g., transceiver 810 of FIG. 8A to the transceiver of the user module, e.g., transceiver 820 of FIG. 8A.

The coupling efficiency for both the central station and user receivers using diverging invisible beams may be reduced relative to using collimated beams by, for example, about 10 dB while the angular alignment sensitivity is substantially reduces from 0.05 deg to 0.5 deg. The coupling efficiency may be calculated based on the following formula wherein D_obj represent the collimator lens diameter and D_spot represents the beam diameter at the receiving collimator.

$$\text{Coupling efficiency} = 10 * \text{Log}(D\_obj/D\_spot)^2$$

For data exchange from a user module, e.g., from transceiver 820 of FIG. 8A to a central station, e.g., to transceiver 810 of FIG. 8A, the invisible light originated from a user module, e.g., at wavelength 1490 nm, may be collimated by objective lens module 962 and then propagate in the free-space between objective lens module 962 and objective lens module 961 until it enters objective lens module 961 of the central station. Then, the light beam may be coupled to a corresponding wire or fiber, and transmitted to central station transceiver, e.g., transceiver 810 of FIG. 8A. The light from user transceiver may be directed to a photo detector, e.g., photo detector 814 of FIG. 8B. Using such a setup a bi-directional connection between a central station and each of user modules may be achieved. Moreover, the best alignment conditions between a central station and each of the user modules may result automatically in the best alignment between user modules transceiver and the central station, simultaneously for all user modules.

Figure 10:
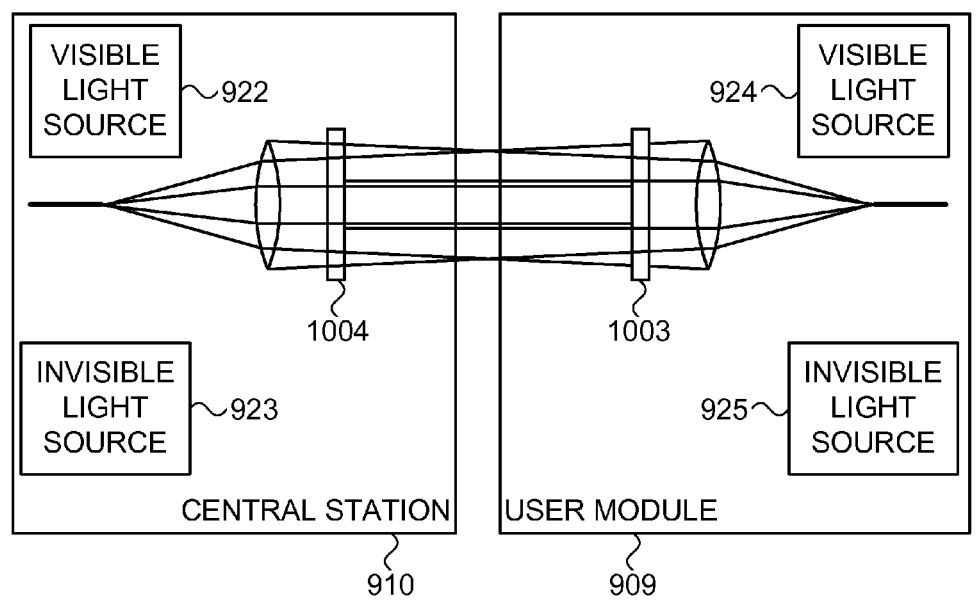
FIG. 10 demonstrates multi visible light alignment according to embodiments of the present invention.

Reference is now made to FIG. 10, which demonstrates multi visible light alignment according to embodiments of the present invention. According to some embodiments of the invention, a user module may include a visible light source, such as a red laser diode, which may be used for alignment purposes instead of using the reflection of the visible light coming from central station as used in other embodiments. Using a visible light source in both central station 910 and user module 909 may accelerate the alignment process. As shown by FIG. 10, both central station 910 and user module 909 may include a visible light source, such as a red laser diode, and an invisible light source, such as infra red laser diode. Central station 910 may include a visible light source 922 and an invisible light source 923 and user module 909 may include a visible light source 924 and an invisible light source 925. For example, central station 910 may include a red laser diode radiating at wavelength of 650 nm and an infra red laser diode radiating at wavelength of 1490 nm. User module 909 may include a red laser diode radiating at wavelength of 650 nm and an infra red laser diode radiating at wavelength of 1310 nm.

The visible light from central station 910 may be used for positioning of user module 909 at a desired place, e.g., on a table, wall or other surface, also referred to herein as "coarse alignment" or "rough alignment". User module 909 may be located such that a visible light spot created by the visible light originated from central station 910 is directed to the center of the user window 1003. After user module 909 is positioned based on the visible light spot originated from central station 910, the visible light originated at user module 909 may be used for "fine alignment". The light originated from user module 909 may be directed to the center of window 1004 of central station 910. According to embodiments of the invention, the visible light coming from user module 909 may be further used for fine tuning of the alignment. The position of user module 909 may changed, modified or adjusted, e.g., the location and the angular orientation of user module 909 may be changed manually or automatically in order to achieve maximal coupling between central station 910 and user module 909, by reaching a precise overlapping of two visible spots on window 1004 of the central station. A first visible light spot may be generated by the beam originated from central station 910 and a second visible light spot may be generated by the beam originated from user module 909. Additionally or alternatively, the positioning may be performed in an automated process, using any suitable means.

Reference is made to FIG. 11, which demonstrates a user module according to embodiments of the invention. A user module 1000 may include a visible light source 1001, e.g., a red laser source radiating, for example, at 650 nm, an invisible light source 1002, e.g., infra red laser source radiating, for example, at 1310 nm, a collimator 1003, a user window 1004 and two optical elements 1005 and 1006. Optical elements 1005 and 1006 may be, for example, mirrors and may be used for an automated adjustment of the direction of the collimated light beam 1008 to be in alignment with a central station (not shown). Optical elements 1005 and 1006 may be used during automated or automatic fine tuning which may be performed by changing, adjusting or tilting the angular position of optical elements 1005 and 1006. The alignment process may use visible light for reaching alignment as described in embodiments of the invention and/or may use invisible light by detecting, monitoring and measuring the invisible and/or visible radiation originating from the central station and measuring the detected power of the radiation arriving to the photo detector of the user module and/or measuring the invisible and/or visible radiation originating from the user module and measuring the detected power of the radiation arriving to the photo detector of the central station.

Each of optical elements 1005 and 1006 may be moved along one of the angular directions, e.g., element 1005 may move along Qx while element 1006 may move along Qy. In other embodiments each of optical elements 1005 and 1006 may be moved freely in the space, in any desired direction. Optical elements 1005 and 1006 may be any suitable optical elements such as mirrors implemented by any method or technology, for example, Micro Electro Mechanical System (MEMS) mirrors, piezoelectric mirrors, etc. According to other embodiments, other number of optical elements may be used, for example, one optical element may be used. A single mirror element may be angularly moved along both Qx and Qy or along Qx, Qy and Qz. Any other number of mirrors or any other technology of automatic mirror adjustment may be used.

Some embodiments of the invention or elements of embodiments of the invention may be implemented, for example, using an article including or being a non-transitory machine-readable or computer-readable storage medium, having stored thereon instructions, that when executed on a computer, cause the computer to perform method and/or operations in accordance with embodiments of the invention. The computer-readable storage medium may store an instruction or a set of instructions that, when executed by a machine (for example, by a computer, a mobile device and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An indoor wireless optical communication system, the system comprising:
   a user unit; and
   a central unit configured to establish a bi-directional optical communication link over a collimated invisible light beam to enable transmission of wireless communications between a remote communication device and the user unit,
   wherein the user unit comprises a first optical transmitter to transmit optical signals over the bi-directional optical communication link and a first optical receiver to receive optical signals transmitted from the central unit over the bi-directional optical communication link,
   wherein the central unit comprises a visible light source configured to produce a collimated visible light beam to enable alignment of the user unit and the central unit upon establishment of the bi-directional optical communication link,
   wherein the user unit comprises a user unit window, to reflect back a portion of the visible light arriving from the central unit,
   wherein the central unit comprises a central unit window, to enable creation of a first light spot, created by light that propagates from the visible light source of the central unit, and a second light spot, created by light that propagates from the visible light source of the central unit and reflected back from the user unit window; and
   the system comprises a positioning unit configured to adjust a position of the user unit is adjusted until the first light spot and the second light spot overlap on the central unit window.

2. The system of claim 1, wherein the central unit comprises a second optical transmitter to transmit optical signals over the bi-directional optical communication link and a second optical receiver to receive optical signals transmitted from the user unit over the bi-directional optical communication link.

3. The system of claim 2, wherein each of the first and second optical transmitters comprises an invisible light source.

4. The system of claim 3, wherein the user unit comprises a power detector to measure the power of the light originated from the invisible light source of the central unit.

5. The system of claim 3, wherein the positioning unit is to adjust a spatial position of the user unit relative to the central unit until a maximal power is measured by the power detector.

6. The system of claim 2, wherein each of the first optical receiver and the second optical receiver comprises a photo sensor.

7. The system of claim 1, wherein the user unit window is positioned substantially perpendicular to an optical axis of light originated from the user unit.

8. The system of claim 1, wherein the central unit comprises one or more optical elements to split collimated light originated from the central unit into a plurality of collimated light beams directed towards a plurality of user units.

9. The system of claim 1, wherein each of the central unit and the users unit comprises a multi-band collimator.

10. A method for creating a bi-directional optical communication link, the method comprising:
    establishing a bi-directional optical communication link over a collimated invisible light beam between a central unit and a user unit to enable transmission of wireless communications between a remote communication device and the user unit;
    transmitting optical signals over the bi-directional optical communication link between the central unit and the user unit; and
    aligning the user unit and the central unit upon establishment of the bi-directional optical communication link by:
    Producing a collimated visible light beam by a visible light source of the central unit;
    observing, on a window of the central unit, a first light spot created by light propagates from the visible light source of the central unit to the user unit;
    reflecting back a portion of the visible light arriving from the central unit by a window of the user unit;
    observing, on the window of the central unit, a second light spot created by light propagates from the visible light source of the central unit and reflected from the window of the user unit;
    adjusting a position of the user unit until the first light spot and the second light spot overlap on the window of the central unit.

11. The method of claim 10, further comprising:
    detecting light originated from an invisible light source of the central unit by a photo sensor located in the user unit;
    measuring the power of the light originated from the invisible light source of the central unit; and
    adjusting spatial position of the user unit relative to the central unit based on the measurements of the power.

12. The method of claim 11, wherein adjusting the spatial position of the user unit is automatically performed by a positioning unit.

13. The method of claim 11, further comprising:
    turning off the visible light upon completion of adjusting the spatial position of the user unit source.

14. The method of claim 10, further comprising:
splitting, by one or more optical elements, the collimated invisible light beam to a plurality of collimated invisible light beams; and
transmitting each of the collimated invisible light beams to a respective one of plurality of user units.

\* \* \* \* \*